(12) United States Patent
Chai et al.

(10) Patent No.: US 10,508,394 B1
(45) Date of Patent: Dec. 17, 2019

(54) DEVICE FOR VEHICLE HINDRANCE AND RAINWATER TREATMENT AND SYSTEM COMPRISING THE SAME

(71) Applicants: Chongqing University, Chongqing (CN); Shenzhen Yuezhong (Group) Co., Ltd., Shenzhen (CN)

(72) Inventors: Hongxiang Chai, Chongqing (CN); Xinqiao Yao, Shenzhen (CN); Yue Shen, Chongqing (CN); Zhaoxiong Zhang, Shenzhen (CN); Zhiyu Shao, Chongqing (CN); Yu Xiang, Chongqing (CN); Wei Kang, Chongqing (CN); Li Gu, Chongqing (CN); Hainan Ai, Chongqing (CN)

(73) Assignees: CHONGQING UNIVERSITY, Chongqing (CN); SHENZHEN YUEZHONG (GROUP) CO., LTD., Shenzhen (CN)

( * ) Notice: Subject to any disclaimer, the term of this patent is extended or adjusted under 35 U.S.C. 154(b) by 44 days.

(21) Appl. No.: 16/011,663

(22) Filed: Jun. 19, 2018

(51) Int. Cl.
| | | |
|---|---|---|
| *E03F 5/04* | (2006.01) | |
| *E01F 15/00* | (2006.01) | |
| *E03F 3/04* | (2006.01) | |
| *E03F 5/14* | (2006.01) | |
| *E03F 5/10* | (2006.01) | |
| *E01F 13/02* | (2006.01) | |

(Continued)

(52) U.S. Cl.
CPC ............ *E01F 15/003* (2013.01); *E01F 13/02* (2013.01); *E03F 3/04* (2013.01); *E03F 5/0403* (2013.01); *E03F 5/0404* (2013.01); *E03F 5/101* (2013.01); *E03F 5/14* (2013.01); *C02F 3/327* (2013.01); *C02F 2103/001* (2013.01); *C02F 2307/00* (2013.01)

(58) Field of Classification Search
CPC ....... E03F 5/0403; E03F 5/0404; E03F 5/101; E03F 5/14; E01F 13/02; E01F 15/003; C02F 3/327
USPC ....... 210/163, 166, 170.03, 602; 404/2, 4, 5, 404/6, 9, 25
See application file for complete search history.

(56) References Cited

U.S. PATENT DOCUMENTS

| | | | | |
|---|---|---|---|---|
| 5,480,254 A * | 1/1996 | Autry | ............ | E03F 5/0404 210/163 |
| 6,261,445 B1 * | 7/2001 | Singleton | ............ | E03F 5/0404 210/163 |

(Continued)

*Primary Examiner* — Christopher Upton
(74) *Attorney, Agent, or Firm* — Matthias Scholl P.C.; Matthias Scholl

(57) ABSTRACT

A device for vehicle hindrance and rainwater treatment including a vehicle hindrance body and a well pit. The vehicle hindrance body includes a lower sidewall, the well pit includes a top opening, and the lower sidewall encloses the top opening. The lower sidewall includes a plurality of water inlet holes. The well pit includes an upper part, a lower part, and a partition disposed between the upper part and the lower part. The partition includes a plurality of leaking holes. The upper part of the well pit includes an outer ring belt filled with a rainwater pretreatment filler, a center ring belt filled with soil, and a rainwater collection ring belt disposed between the outer ring belt and the inner ring belt. The lower part includes a water-sand separating folded plate, a water-sand discharging channel, a rainwater collecting tank, and a rainwater storage chamber.

6 Claims, 5 Drawing Sheets

(51) Int. Cl.
*C02F 103/00* (2006.01)
*C02F 3/32* (2006.01)

(56) References Cited

U.S. PATENT DOCUMENTS

| | | | |
|---|---|---|---|
| 6,277,274 B1* | 8/2001 | Coffman | C02F 3/327 |
| | | | 210/170.03 |
| 6,517,279 B1* | 2/2003 | Camomilla | E01F 15/0415 |
| | | | 404/6 |
| 8,734,047 B2* | 5/2014 | Hughes, Jr. | E01F 9/629 |
| | | | 404/9 |
| 8,889,000 B2* | 11/2014 | Hannemann | E03F 5/14 |
| | | | 210/170.03 |
| 9,469,981 B2* | 10/2016 | Allard | E03F 5/0404 |
| 9,719,240 B1* | 8/2017 | Montague | E03F 5/0404 |
| 2004/0076468 A1* | 4/2004 | McKay | E01F 15/0476 |
| | | | 404/6 |
| 2012/0091057 A1* | 4/2012 | Kent | C02F 3/327 |
| | | | 210/170.03 |
| 2013/0092632 A1* | 4/2013 | Allard | E03F 5/0404 |
| | | | 210/170.03 |
| 2018/0179748 A1* | 6/2018 | Iorio | E03F 5/0404 |

* cited by examiner

DEVICE FOR VEHICLE HINDRANCE AND RAINWATER TREATMENT AND SYSTEM COMPRISING THE SAME

CROSS-REFERENCE TO RELAYED APPLICATIONS

The contents of Chinese Patent Application No. 201710027764.3 filed Jan. 16, 2017 and any intervening amendments thereto are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, and Cambridge, Mass. 02142.

BACKGROUND

The disclosure relates to a device and system for vehicle hindrance and rainwater treatment.

A vehicle hindrance device is installed at the entrance of roads and squares to prevent vehicles from entering the no-driving zone.

The urbanization process deepens the waterlogging and non-point source pollution, which poses a severe threat to the urban water system. Conventionally, the collection and purification of rainwater occupy a large amount of land area.

SUMMARY

The disclosure provides a device and system for vehicle hindrance and rainwater treatment, which occupy less land area.

Disclosed is a device for vehicle hindrance and rainwater treatment comprising a vehicle hindrance body and a well pit; the vehicle hindrance body comprises a lower sidewall, the well pit comprises a top opening, and the lower sidewall encloses the top opening; the lower sidewall comprises a plurality of water inlet holes; the well pit comprises an upper part, a lower part, and a partition disposed between the upper part and the lower part; the partition comprises a plurality of leaking holes.

The upper part of the well pit comprises an outer ring belt filled with a rainwater pretreatment filler, a center ring belt filled with soil, and a rainwater collection ring belt disposed between the outer ring belt and the inner ring belt.

The rainwater collection ring belt comprises a top water inlet, and the elevation of the top water inlet is greater than the elevation of the rainwater pretreatment filler and the elevation of the soil. Two side walls of the lower part of the rainwater collection ring belt are provided with equally spaced sandproof holes. A sand-gravel cushion is disposed below the soil.

The upper part communicates with the lower part through the leaking holes of the partition. The lower part comprises a water-sand separating folded plate, a water-sand discharging channel, a rainwater collecting tank, and a rainwater storage chamber.

The water-sand separating folded plate is disposed below the leaking holes, and one end of the water-sand separating folded plate is fixed on a side wall of the lower part; the water-sand separating folded plate comprises a plurality of grooves and a plurality of sand discharging holes are disposed in the grooves at regular intervals.

The water-sand discharging channel is disposed right below the sand discharging holes. The rainwater collecting tank is disposed at an outer side of the water-sand discharging channel. The other end of the water-sand separating folded plate extends above the rainwater collecting tank at the outer side of the water-sand discharging channel. The rainwater collecting tank is disposed between the rainwater storage chamber and the water-sand discharging channel. The rainwater collecting tank and the rainwater storage chamber share a partition wall; a lower part of the partition wall comprises a through hole, and the rainwater collecting tank communicates with the rainwater storage chamber via the through hole.

The outer ring belt, the rainwater collection ring belt and the center ring belt can be disposed concentrically.

The vehicle hindrance body can be a transparent or semi-transparent hemispherical cover for light transmission, and a hole can be disposed on the cover for ventilation.

Two rows of water inlet holes can be provided on the lower sidewall of the vehicle hindrance body.

A grille can be disposed on the top water inlet of the rainwater collection ring belt.

Further disclosed is a rainwater treatment system comprising a plurality of devices for vehicle hindrance and rainwater treatment, a plurality of water-sand discharging pipes, and a plurality of rainwater outlet pipes. The plurality of devices for vehicle hindrance and rainwater treatment is arranged at intervals. The bottom elevation of a previous device for vehicle hindrance and rainwater treatment is greater than the bottom elevation of a next device for vehicle hindrance and rainwater treatment. The water-sand discharging channel of the previous device is connected to the water-sand discharging channel of the next device via one of the plurality of water-sand discharging pipes. The rainwater storage chamber of the previous device is connected to the sand-gravel cushion of the next device via one of the plurality of the rainwater outlet pipes.

The disclosure further provides a vehicle hindrance and rainwater treatment system comprising a plurality of devices for vehicle hindrance and rainwater treatment, a plurality of water-sand discharging pipes, a plurality of rainwater outlet pipes; a plurality of rainwater supply tanks; and a plurality of rainwater conveying pipes. The plurality of devices for vehicle hindrance and rainwater treatment is arranged at intervals; the plurality of devices for vehicle hindrance and rainwater treatment is divided into a plurality of groups according to the elevations of the rainwater storage chambers, and the rainwater storage chambers in the same group have the same or approximately the same elevation; the water-sand discharging channels of the plurality of devices are connected via the plurality of water-sand discharging pipes; the rainwater storage chambers having the same or approximately the same elevation in a first group are connected via the plurality of rainwater outlet pipes, and the plurality of rainwater outlet pipes is connected to one of the plurality of rainwater supply tanks; and the one of the plurality of rainwater supply tanks is connected to sand-gravel cushions of a plurality of devices in a second group via one of the plurality of rainwater conveying pipes.

Advantages of the vehicle hindrance and rainwater treatment device and system of the disclosure are summarized as follows:

1. The device and system occupy less land area;
2. The device and system can separate the rainwater at different stages, and treat the rainwater according to different water quality, which can improve the greening and the water quality of reused rainwater, reduce the water pollution to the green plants, and solve the water supply problem of green plants when there is no rain;

3. The device and system are helpful in reducing the pollution of the urban water system;

4. The device and system are helpful in reducing the pressure of flood drainage of the urban rainwater pipe network at the time of heavy rain; and 5. The device and system are helpful in vehicle hindrance, aesthetics, purification, reuse, and flood prevention.

Figure 1:
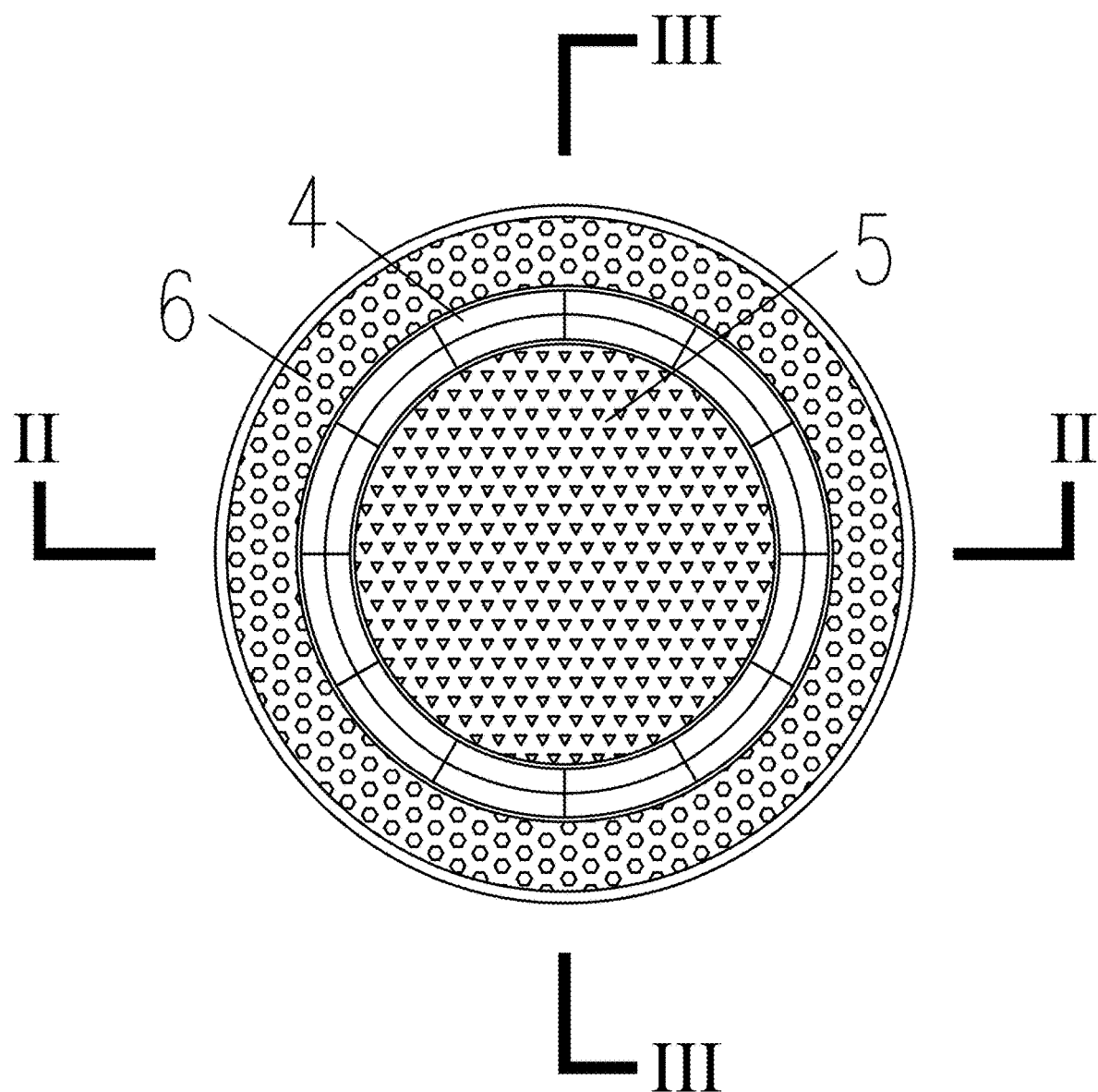
FIG. 1 is a horizontal cross-sectional view of a device for vehicle hindrance and rainwater treatment in the disclosure.

In the drawings, the following reference numbers are used: 1. Green landscape plant; 2. Vehicle hindrance body; 3. Water inlet hole; 4. Rainwater collection ring belt; 5. Soil; 6. Rainwater pretreatment filler; 7. Grille; 8. Sandproof hole; 9. Partition; 10. Rainwater storage chamber; 11. Water-sand discharging channel; 12. Through hole; 13. Water-sand separating folded plate; 14. Well pit; 15. Sand-gravel cushion; 16. Water-sand discharging pipe; 17. Rainwater outlet pipe; 18. Rainwater supply tank; 19. Rainwater conveying pipe; 20. Leaking hole.

DETAILED DESCRIPTION

To further illustrate, experiments detailing a device and system for vehicle hindrance and rainwater treatment are described below. It should be noted that the following examples are intended to describe and not to limit the description.

Figure 2:
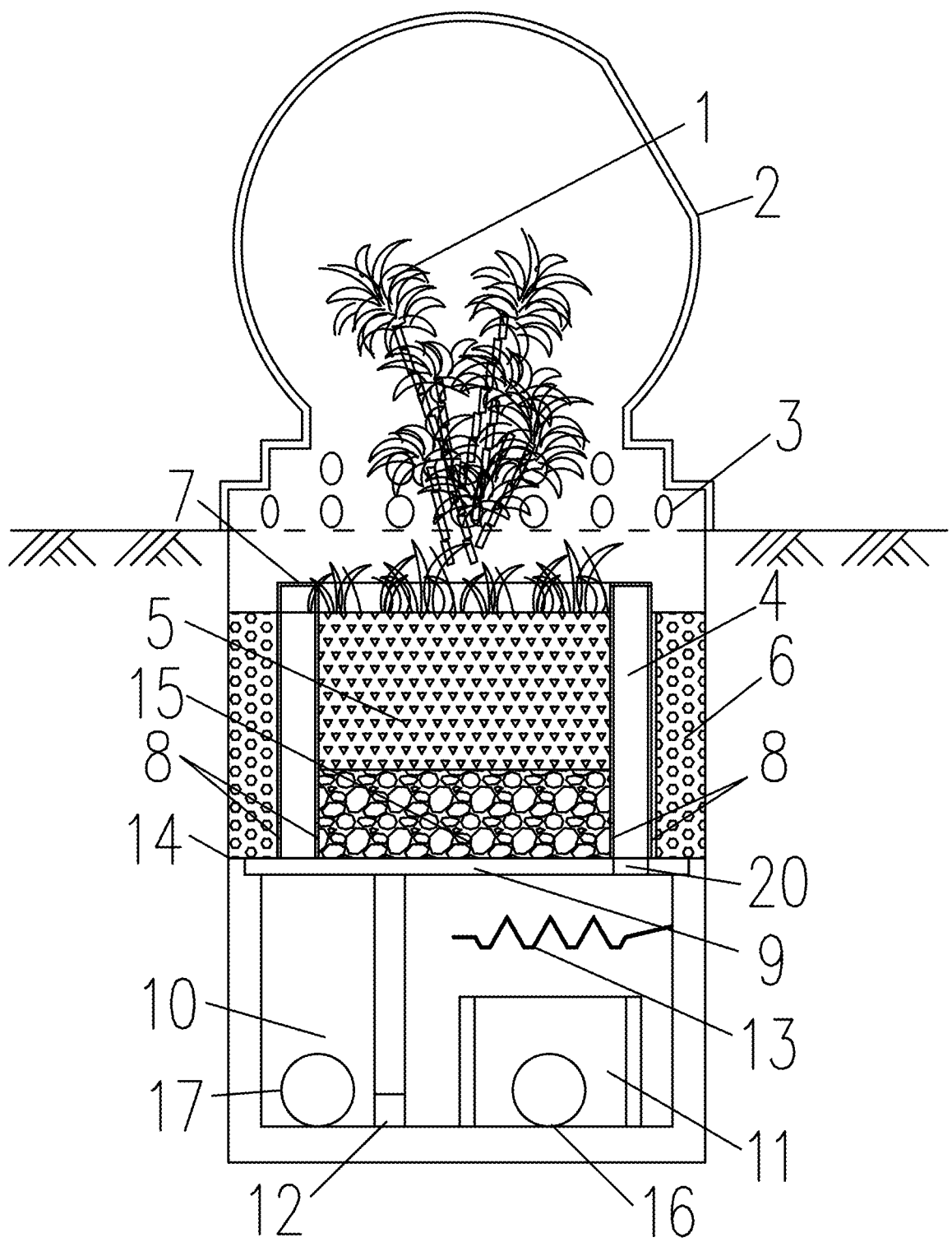
FIG. 2 is a cross-sectional view along line II-II in FIG. 1.
Figure 3:
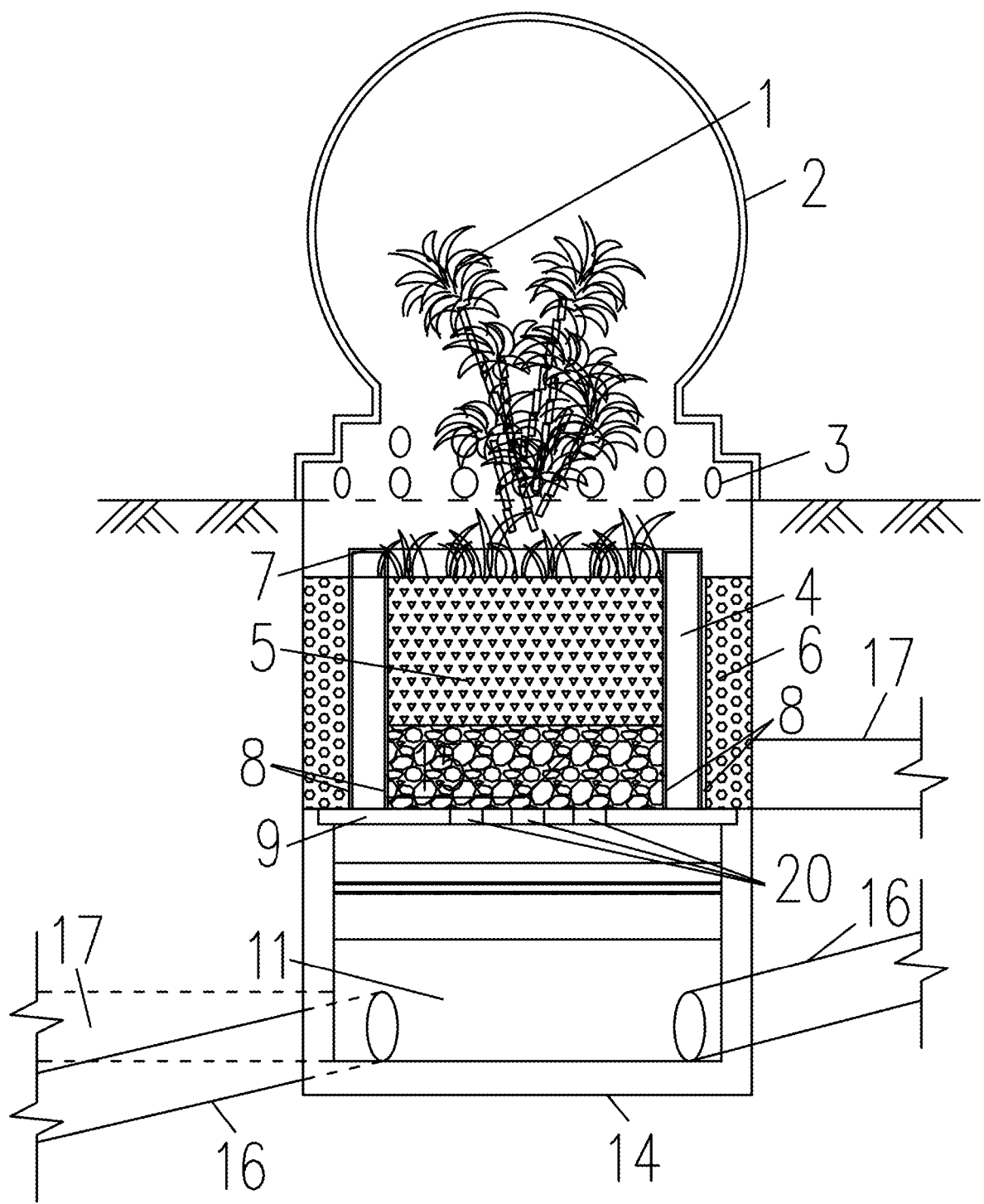
FIG. 3 is a cross-sectional view along line in FIG. 1.

As shown in FIG. 1, FIG. 2 and FIG. 3, a device for vehicle hindrance and rainwater treatment according to the disclosure comprises a vehicle hindrance body 2 and a well pit 14. The vehicle hindrance body 2 covers the top opening of the well pit 14. The vehicle hindrance body 2 comprises a lower sidewall, and the lower sidewall comprises a plurality of water inlet holes 3. The well pit 14 comprises an upper part, a lower part, and a partition 9 disposed between the upper part and the lower part. The partition comprises a plurality of leaking holes 20; the upper part communicates with the lower part through the leaking holes 20 of the partition 9.

The upper part of the well pit comprises an outer ring belt, a center ring belt, and a rainwater collection ring belt 4 disposed between the outer ring belt and the inner ring belt. The center ring belt of the upper part is filled with soil 5. The outer ring belt of the upper part is filled with rainwater pretreatment filler 6. The rainwater collection ring belt 4 comprises a top water inlet, and the elevation of the top water inlet is greater than the elevation of the rainwater pretreatment filler 6 and the elevation of the soil 5. The green landscape plants 1 are planted on the soil 5. Two side walls of the lower part of the rainwater collection ring belt are provided with equally spaced sandproof holes 8; and a sand-gravel cushion 15 is provided below the soil 5.

The lower part comprises a water-sand separating folded plate 13, a water-sand discharging channel 11, a rainwater collecting tank, and a rainwater storage chamber 10;

The water-sand separating folded plate 13 is provided below the leaking holes 20. One end of the water-sand separating folded plate 13 is fixedly connected to the wall of the well pit 14. Sand discharging holes are provided at a fixed interval in the groove of the water-sand separating folded plate 13. The water-sand discharging channel 11 is disposed right below the sand discharging holes. The rainwater collecting tank is provided at the outer side of the water-sand discharging channel 11. The other end of the water-sand separating folded plate 13 extends above the rainwater collecting tank at the outer side of the water-sand discharging channel 11. The partition wall at one side of the rainwater collecting tank is provided with a through hole 12, and the rainwater collecting tank communicates with the rainwater storage chamber 10 via the through hole 12.

The vehicle hindrance body 2 is a hemispherical cover made of high transparency and high strength material, and a hole is disposed on the cover for ventilation and light transmission.

Two rows of water inlet holes 3 are provided on the sidewall of the bottom of the vehicle hindrance body 2. When rain is moderate or light, the surface water runoff smoothly enters through the first row of small holes. The overflowing area may be increased through the upper row of water inlet holes during heavy rain so as to ensure smooth drainage.

A grille 7 can be provided to cover the top water inlet of the rainwater collection ring belt 4. The meshes of the grille 7 adapt to block large solid wastes such as leaves and garbage bags.

The rainwater pretreatment filler 6 may be a prefabricated filler and may be periodically cleaned. A gravel grading filler may also be used on roads with excellent environmental conditions and scarce vehicles.

The size of the sand discharging hole depends on the particle size and dimension of the sediment concentration of the rainwater quality in the local rainwater; the plate at the junction of the water-sand separating folded plate 13 and the wall of the well pit 14 has an angle of inclination with respect to the horizontal direction, and is a folded plate in the slope direction.

The dimensions and materials of the various parts of the device for vehicle hindrance and rainwater treatment according to the disclosure are determined after a small test according to the local rainstorm intensity and environmental conditions so as to achieve better operating conditions.

The working principle of the device for vehicle hindrance and rainwater treatment according to the disclosure is as follows.

At the beginning of rainfall, rainwater forms surface runoff on roads, squares, and other road surfaces. Rainwater gathers along the slope of the ground and flows into the device for vehicle hindrance and rainwater treatment through the water inlet holes 3 around the vehicle hindrance body. At the early stage, the dirty rainwater basically infiltrates from the upper part of the rain pretreatment filler 6 since the horizontal flow rate of inflow is small due to the small rainfall (if the infiltrating speed is smaller than the inflow rate of the rainwater at the initial stage, part of the rainwater may overflow through the grille 7 at the top of the rainwater collection ring belt 4 into the rainwater collection ring belt 4). The contaminants in rainwater are removed by adsorption by the rain pretreatment filler 6. Clean rainwater enters the rainwater collection ring belt 4 from the bottom of the filler through the sandproof hole 8 on the wall of the adjacent rainwater collection ring belt 4, and then enters one end of the water-sand separating folded plate 13 through the leaking hole 20 at the bottom of the rainwater collection ring belt 4. As the amount of water increases, rainwater overflows at multiple levels on the water-sand separating folded plate 13. At the same time, the fine sand of rainwater falls into the water-sand discharging channel 11 through the small holes in the groove of the water-sand separating folded plate 13 through the sedimentation effect, and then flows into the water-sand discharging channel of the device at the next stage, and finally flows into the rainwater pipe network, while a large amount of clean rainwater drops into the rainwater collecting tank at the outer side of the water-sand discharging channel 11 from one end of the water-sand separating folded plate 13 and flows into the rainwater storage chamber 10 through the through hole 12 for subsequent use as required.

With the increase of rainfall and the increase of surface runoff, the depth of accumulated water in roads and squares is increased. Rainwater may enter through two rows of water inlet holes in the vehicle hindrance body 2. Moreover, the horizontal flow rate increases so that relatively clean rainwater from the upper row of water inlet holes passes through the jet flow. A small part of the rainwater may enter the rainwater collection ring belt 4 through the grille 7 of the rainwater collection ring belt 4. A large amount of rainwater gathers into the soil 5 of the green plant in which part of the rainwater removes contaminants through the infiltration process of the soil, passes through the sand-gravel cushion underlying the soil, and then enters the rainwater collection ring belt 4 through the sandproof hole 8 on the wall of the adjacent rainwater collection ring belt 4. Most of the rainwater flows into the rainwater collection ring belt 4 from the grille 7 by overflowing, and then rainwater from the rainwater collection ring belt 4 enters one end of the water-sand separating folded plate 13 through the leaking hole 20 at the bottom of the rainwater collection ring belt. As the amount of water increases, rainwater overflows at multiple levels on the water-sand separating folded plate 13. At the same time, the fine sand of rainwater falls into the water-sand discharging channel 11 through the small holes in the groove of the water-sand separating folded plate 13 through the sedimentation effect, and then flows into the water-sand discharging channel of the device at the next stage, and finally flows into the rainwater pipe network, while a large amount of clean rainwater drops into the rainwater collecting tank at the outer side of the water-sand discharging channel 11 from one end of the water-sand separating folded plate 13 and flows into the rainwater storage chamber 10 through the through hole 12 for subsequent use as required. When there is too much rainwater and the amount of clean water exceeds the effective volume of the rainwater storage chamber 10, the excess rainwater will overflow from the top of the water-sand discharging channel 11 and flow away along with the abandoning rainwater.

With the decrease of rainfall and the gradual decrease of surface runoff, the rainwater at the later stage with better water quality follows the flowing path of the rainwater at the initial stage. Since the rainwater at the later stage is relatively clean, it plays a role in cleaning while reducing the pollution load of the rainwater pretreatment filler 6. Dirty rainwater infiltrates into the rainwater collection ring belt 4, and then enters the water-sand separating folded plate 13 through the leaking hole 20 at the bottom of the rainwater collection ring belt. With the decrease of rainfall, the amount of rainwater is not enough to overflow through the water-sand separating folded plate 13 so that all the dirty rainwater drops into the water-sand discharging channel 11 from small holes in the groove of the folded plate to implement abandoning.

Figure 4:
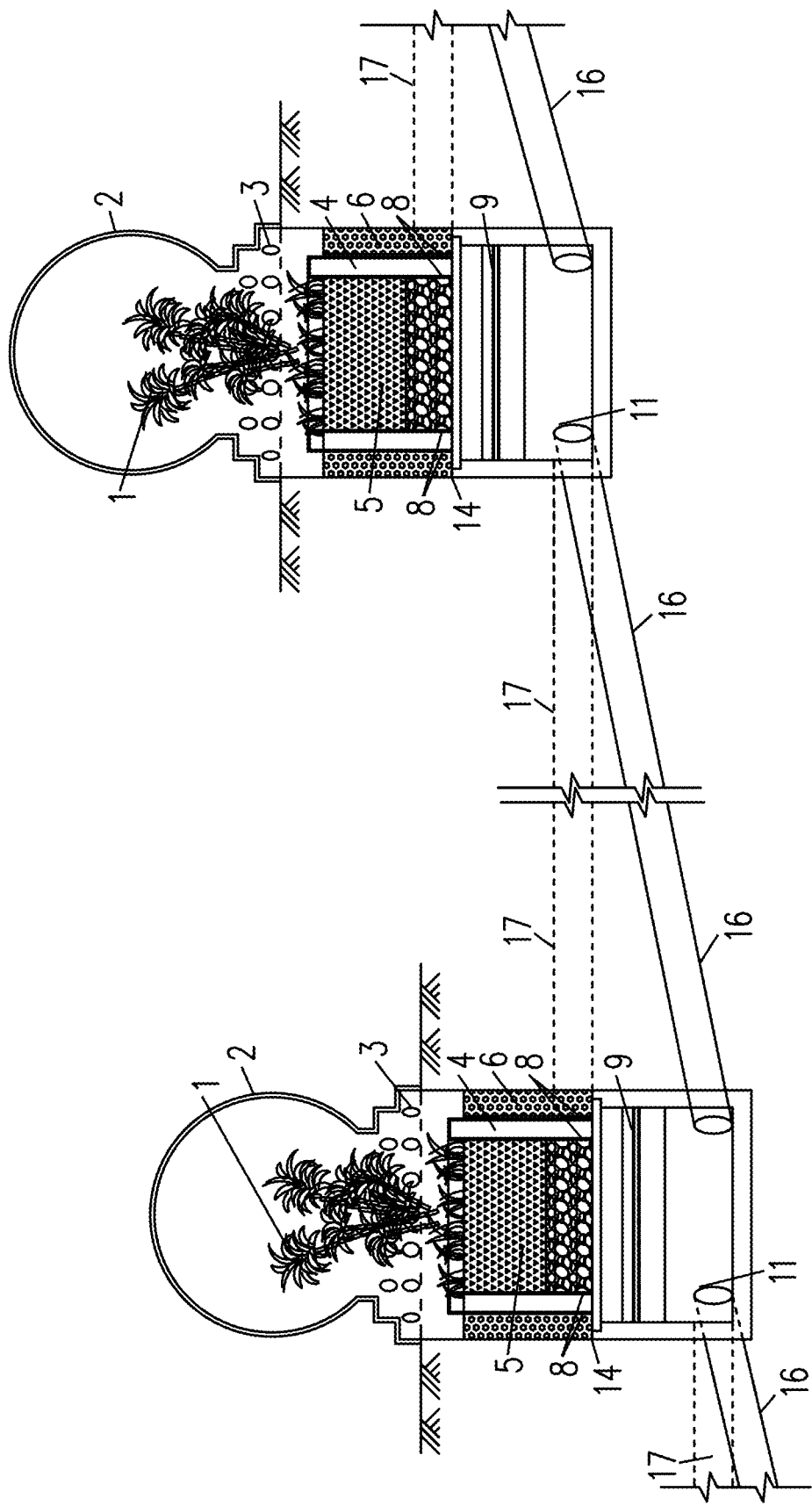
FIG. 4 is a schematic diagram of a vehicle hindrance and rainwater treatment system according to the disclosure.

As shown in FIG. 3 and FIG. 4, according to the disclosure, a system for vehicle hindrance and rainwater treatment comprises a plurality of devices for vehicle hindrance and rainwater treatment, a plurality of water-sand discharging pipes 16 and a plurality of rainwater outlet pipes 17. The plurality of devices for vehicle hindrance and rainwater treatment is arranged along a road at intervals. The bottom elevation of a previous device for vehicle hindrance and rainwater treatment is greater than the bottom elevation of a next device for vehicle hindrance and rainwater treatment. The water-sand discharging channels 11 of the previous device and the next device are connected via the water-sand discharging pipes 16. The rainwater storage chamber 10 of the previous device for vehicle hindrance and rainwater treatment is connected to the sand-gravel cushion 15 at the bottom of the green landscape plant 1 of the next device for vehicle hindrance and rainwater treatment via the rainwater outlet pipe 17. The system comprising the device for vehicle hindrance and rainwater treatment is suitable for situations where the slope of the road is large and the two adjacent device for vehicle hindrance and rainwater treatment have a large fall.

In the case of roads, squares, etc., with large slopes, the lowest water level of rainwater collected by the rainwater storage chamber in the device for vehicle hindrance and rainwater treatment is slightly higher than the bottom of the sand-gravel cushion of the next set of vehicle-hindrance devices so as to be capable of continuously supplying water to green plants in the next set of vehicle-hindrance devices when there is no rain. The abandoning water in the water-sand discharging channel is connected to the rainwater pipe network.

Figure 5:
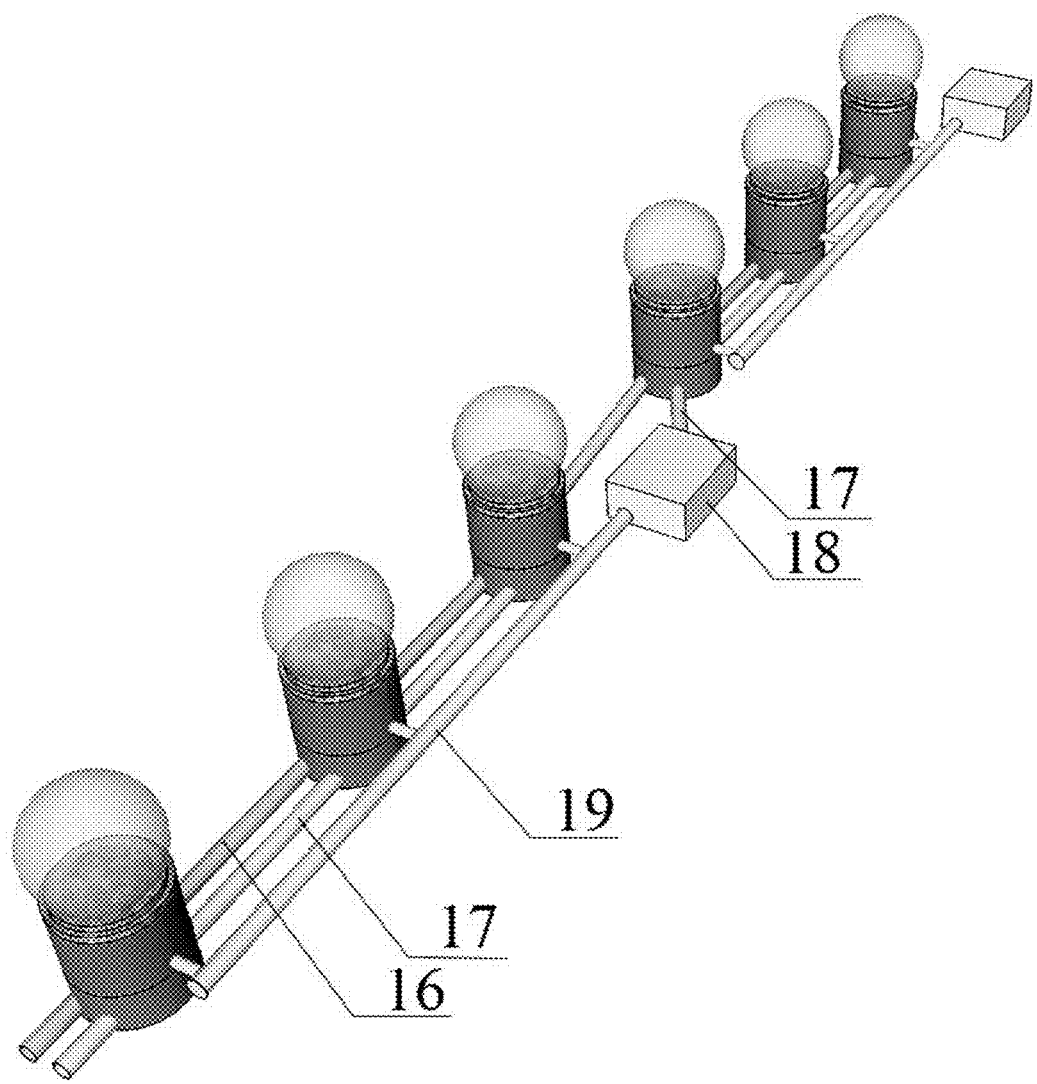
FIG. 5 is a schematic diagram of another vehicle hindrance and rainwater treatment system in the disclosure.

As shown in FIG. 5, the disclosure provides another system for vehicle hindrance and rainwater treatment, comprising a plurality of devices for vehicle hindrance and rainwater treatment, a plurality of water-sand discharging pipes 16, a plurality of rainwater outlet pipes 17, a plurality of rainwater supply tanks 18 and a plurality of rainwater conveying pipes 19. The plurality of devices for vehicle hindrance and rainwater treatment is divided into a plurality of groups according to the elevations of the rainwater storage chambers, and the rainwater storage chambers 10 in the same group have the same or approximately the same elevation; the water-sand discharging channels 11 of the plurality of devices are connected via the plurality of water-sand discharging pipes 16; the rainwater storage chambers 10 having the same or approximately the same elevation in a first group are connected via the plurality of rainwater outlet pipes 17, and the plurality of rainwater outlet pipes is connected to one of the plurality of rainwater supply tanks 18; and the one of the plurality of rainwater supply tanks 18 is connected to sand-gravel cushions 15 of a plurality of devices in a second group via one of the plurality of rainwater conveying pipes 19. The system comprising the device for vehicle hindrance and rainwater treatment is suitable for use where the slope of the road is moderate and the two adjacent device for vehicle hindrance and rainwater treatment have a small fall.

In the case of roads, squares, etc. with small slopes, the rainwater storage chambers of several devices for vehicle hindrance and rainwater treatment with similar elevations are communicated. When there is a significant difference from the elevation of the next set of several vehicle-hindrance devices, a rainwater supply tank is connected to the water outlet pipe of a rainwater storage chamber at the end of the previous set of device for vehicle hindrance and rainwater treatment. A rainwater conveying pipe is connected to the other side of the rainwater supply tank. The rainwater conveying pipe is connected to the bottom of the sand-gravel cushion of each of the next set of vehicle-hindrance devices via a branch pipe. The lowest water level of the water supply tank is slightly higher than the bottom of the sand-gravel cushion of the next set of vehicle-hindrance devices so as to be capable of continuously supplying water to green plants in the next set of vehicle-hindrance devices when there is no rain. The abandoning water in the water-sand discharging channel is connected to the rainwater pipe network. If there is sufficient local rainfall, a pipe may be connected at the top of the rainwater supply tank for storing excess rainwater or for subsequent use.

Plants planted in the device for vehicle hindrance and rainwater treatment should be ornamental wet-weather herb that is resistant to floods and drought. Suitable plants are selected according to different environmental conditions in different regions, and different plants are selected to improve decontamination and ornamental value on the premise of determining survivability.

The calculation of the specific size of each part of the device for vehicle hindrance and rainwater treatment should be roughly determined based on theoretical calculations, and should be actually adjusted based on experience.

Determination of the amount of runoff: calculation according to $Q_y = \varphi q F$.

In the equation: $Q_y$ is the designed rainwater flow (L/s); $\varphi$ is the runoff coefficient, which is measured according to actual conditions and may be approximated by the following table if there is no actual measurement coefficient; q is the rainstorm intensity (L/s·ha); F is the catchment area (ha).

TABLE 1

Runoff coefficient of rainwater on roads and squares

| Surface type | Surface treating method | $\varphi$ |
|---|---|---|
| Roads and squares | Pitch, and seamless concrete | 0.9 |
| | Fixed stone pavement | 0.65 |
| | Lawn checkered stones | 0.14 |
| | Stone pavement with tight seams | 0.78 |
| | Pitch with seams | 0.55 |
| | Laminated stones (permeable bricks) | 0.24 |
| | Gravel lawn with seams | 0.36 |

The rainstorm intensity q may be selected and calculated according to the *Latest National Rainstorm Intensity Formula in* 2014.

The catchment area may be roughly measured or estimated.

The horizontal flow rate of the rainwater is roughly calculated based on the equation of the inner and outer curves of the jet parabola.

The equation of the outer curve of the jet parabola is:

$$X = 0.36 v^{2/3} + 0.6 y^{4/7}$$

The equation of the inner curve of the jet parabola is:

$$X = 0.18 v^{4/7} + 0.7 y^{3/4}$$

In the equation, v is the flow rate of rainwater in the water inlet pipe (m/s);
X is the abscissa of any point on the jet parabola (m);
y is the ordinate of any point on the jet parabola (m);
Due to the small aperture of the water inlet hole of the vehicle hindrance body, this calculation only calculates the equation of the outer curve, approximately instead of the flow line of the entire jet flow.

$$A_z = \frac{Q_y}{nv}$$

is used, where $A_{hole}$ is the area of a water inlet hole, n is the number of water inlet holes in the vehicle hindrance body, and $Q_y$ is the designed rainwater flow (L/s).

The infiltration coefficients of the soil and the rainwater pretreatment filler are selected according to the size of actual runoff, and should not be too small, otherwise the drainage is not smooth; the coefficients should not be too large either, and if the contact time is too short, it is not conducive to the removal of contaminants.

The total area of the water inlet holes at both sides of the bottom of the rainwater collection ring belt is not less than the total area of the water inlet holes of the vehicle hindrance body. The total area of the rainwater discharging holes at the bottom should meet the requirements that the total runoff entering the vehicle hindrance body smoothly flows away.

The included angle between the folded plate at both sides of the groove of the water-sand separating folded plate and the horizontal direction should not be less than 60°. The size of the sand discharging holes at the bottom of the groove should be determined according to the particle size of 80% of the pretreated fine sand in the water outlet hole of the actual rainfall. The number of the sand discharging holes depends on the actual situation.

The total area of the water inlet holes of the rainwater storage chamber should not be less than the total area of the water outlet holes of the rainwater collection ring belt.

The vertical spacing between the water-sand separating folded plate and the water-sand discharging pipe should meet the overflow requirement of excess rain outside the effective volume of the rainwater storage chamber.

When several devices for vehicle hindrance and rainwater treatment form a system, in the case of a large slope, it is ensured that the bottom elevation of the rainwater storage chamber of the previous device for vehicle hindrance and rainwater treatment is not lower than the bottom elevation of the sand-gravel cushion of the next vehicle-hindrance device. The connecting pipe of the water-sand discharging channel should meet the requirements of the *Code for Design of Outdoor Wastewater Engineering* (GB50014-2006).

In the case of a small slope, it is ensured that the bottom elevation of the rainwater storage chambers of the previous set of several device for vehicle hindrance and rainwater treatment is not lower than the bottom elevation of the sand-gravel cushion of the next set of device for vehicle hindrance and rainwater treatment, and the bottom elevation of the intermediate rainwater supply tank should not be lower than the bottom elevation of the sand-gravel cushion of the next set of device for vehicle hindrance and rainwater treatment. It is ensured that the clean rainwater from the rainwater supply tank can be supplied to the green plants in the next set of vehicle-hindrance devices to survive when there is no rain. The connecting pipe of the water-sand discharging channel should meet the requirements of the *Outdoor Drainage Design Specifications* (GB50014-2006).

Advantages of the vehicle hindrance and rainwater treatment device and system of the disclosure are summarized as follows: 1. the device and system occupies less land area, and can save the land by utilizing the urban ineffective area, especially for the limited use of land in the old city; 2. the device and system can separate the rainwater at different stages, and treat the rainwater according to different water quality, which can improve the greening and the water quality of reused rainwater, reduce the water pollution to the green plants, and solve the water supply problem of green plants when there is no rain; 3. the device and system are helpful in reducing the pollution of the urban water system; 4. the device and system are helpful in reducing the pressure of flood drainage of the urban rainwater pipe network at the time of heavy rain; and 5. the device and system are helpful in vehicle hindrance, aesthetics, purification, reuse, and flood prevention.

Unless otherwise indicated, the numerical ranges involved include the beginning and end values. It will be obvious to those skilled in the art that changes and modifications may be made, and therefore, the aim in the appended claims is to cover all such changes and modifications.

What is claimed is:

1. A device, comprising:
   1) a vehicle hindrance body comprising a lower sidewall, the lower sidewall comprising a plurality of water inlet holes;
   2) a well pit, the well pit comprising a top opening, an upper part, a lower part, and a partition disposed between the upper part and the lower part;
   wherein:
   the lower sidewall encloses the top opening;
   the partition comprises a plurality of leaking holes; the upper part communicates with the lower part through the leaking holes of the partition;
   the upper part of the well pit comprises an outer ring belt filled with a rainwater pretreatment filler, a center ring belt filled with soil, and a rainwater collection ring belt disposed between the outer ring belt and the inner ring belt;
   the rainwater collection ring belt comprises a top water inlet, and an elevation of the top water inlet is greater than an elevation of the rainwater pretreatment filler and an elevation of the soil; two side walls of the lower part of the rainwater collection ring belt are provided with equally spaced sandproof holes; and a sand-gravel cushion is disposed below the soil;
   the lower part comprises a water-sand separating folded plate, a water-sand discharging channel, a rainwater collecting tank, and a rainwater storage chamber;
   the rainwater collecting tank is disposed at an outer side of the water-sand discharging channel and between the water-sand discharging channel and the rainwater storage chamber; the water-sand separating folded plate is disposed below the leaking holes of the partition, and one end of the water-sand separating folded plate is fixed on a side wall of the lower part, the other end of the water-sand separating folded plate extends above the rainwater collecting tank;
   the water-sand separating folded plate comprises a plurality of grooves and a plurality of sand discharging holes are disposed in the grooves at regular intervals; the water-sand discharging channel is disposed right below the sand discharging holes; and
   the rainwater collecting tank and the rainwater storage chamber share a partition wall; a lower part of the partition wall comprises a through hole, and the rainwater collecting tank communicates with the rainwater storage chamber via the through hole.

2. The device of claim 1, wherein the outer ring belt, the rainwater collection ring belt and the center ring belt are disposed concentrically.

3. The device of claim 2, wherein the vehicle hindrance body is a transparent or semi-transparent hemispherical cover for light transmission, and a hole is disposed on the cover for ventilation.

4. The device of claim 3, wherein a grille is disposed on the top water inlet of the rainwater collection ring belt.

5. A vehicle hindrance and rainwater treatment system, comprising:
   a plurality of devices of claim 1;
   a plurality of water-sand discharging pipes; and
   a plurality of rainwater outlet pipes;
   wherein:
   the plurality of devices for vehicle hindrance and rainwater treatment is arranged at intervals;
   a bottom elevation of a previous device for vehicle hindrance and rainwater treatment is greater than a bottom elevation of a next device for vehicle hindrance and rainwater treatment;
   the water-sand discharging channel of the previous device is connected to the water-sand discharging channel of the next device via one of the plurality of water-sand discharging pipes; and
   the rainwater storage chamber of the previous device is connected to the sand-gravel cushion of the next device via one of the plurality of the rainwater outlet pipes.

6. A vehicle hindrance and rainwater treatment system, comprising:
   a plurality of devices of claim 1;
   a plurality of water-sand discharging pipes;
   a plurality of rainwater outlet pipes;
   a plurality of rainwater supply tanks; and
   a plurality of rainwater conveying pipes;
   wherein:
   the plurality of devices for vehicle hindrance and rainwater treatment is arranged at intervals;
   the plurality of devices for vehicle hindrance and rainwater treatment is divided into a plurality of groups according to the elevations of the rainwater storage chambers, and the rainwater storage chambers in the same group have the same or approximately the same elevation;
   the water-sand discharging channels of the plurality of devices are connected via the plurality of water-sand discharging pipes;
   the rainwater storage chambers having the same or approximately the same elevation in a first group are connected via the plurality of rainwater outlet pipes, and the plurality of rainwater outlet pipes is connected to one of the plurality of rainwater supply tanks; and
   the one of the plurality of rainwater supply tanks is connected to sand-gravel cushions of a plurality of devices in a second group via one of the plurality of rainwater conveying pipes.

* * * * *